Patented Jan. 29, 1952

2,583,985

UNITED STATES PATENT OFFICE 2,583,985

CEMENTITIOUS COATINGS OR PAINTS AND METHOD OF MAKING

Steven B. Avery, East Orange, N. J.

No Drawing. Application January 5, 1950, Serial No. 137,027

2 Claims. (Cl. 106—89)

My invention relates to hydraulic cement and/or lime paints or coatings of improved quality in that the coatings of this invention will not pass water through them in either direction under modest hydraulic pressures, such as five to six pounds per square inch.

Water is commonly used as a vehicle for solutions of Portland cement or lime that is to be employed as a paint or coating, and metal stearate is used as a water repellent. Very often calcium or sodium chloride are used because their hygroscopic qualities prevent the coating from drying out before the cement or lime has had time to harden.

The metal stearates are unsatisfactory, however, in that the cement or lime coating is only temporarily water-repellent, inasmuch as the stearates decompose on exposure to weather and, in addition, do not fill the pores and voids of the cement or lime that are left by water evaporation. Waxes, tars, asphalts and tallows act in the same manner as stearates.

The use of calcium or sodium chlorides in water solutions of cement or lime increases the temperature of the mixture, often causing too rapid setting with consequent checking or crazing of the coating.

It is the object of this invention to provide a cementitious coating, for masonry surfaces for example, from hydraulic cement or lime or cement and lime, using water as a vehicle, that will not pass water in either direction; a coating which is free from checking and a coating which is substantially permanent in character.

In the practice of my invention, I add to cement and water or lime and water or to cement, lime, and water a material which is water-soluble, but which, upon drying out, will combine with oxygen from the air and water to form a water-insoluble material with a considerably increased volume over its original state, so that the pores and voids of the cement and/or lime coating left by evaporation will be filled with a water-insoluble material which does not deteriorate upon exposure to weather.

It is desirable that the material employed be hygroscopic in character so as to absorb water from the air and thus prevent too rapid drying of the cement or lime. It is desirable also that it does not raise the temperature of the cement or lime and water mixture to the extent that the setting of the cement or lime will be sufficiently rapid to cause checking or crazing.

I have discovered that the addition of stannous chloride to a mixture of cement and/or lime and water will meet the requirements above set out.

Upon the addition of the stannous chloride to the mixture of cement and/or lime and water, the chloride dissolves in the water and, upon drying, combines chemically with water and oxygen from the air to form water-insoluble stannous oxychloride. I find also that there is sufficient increase in volume so that the pores and voids of the cement and/or lime are substantially filled with the oxychloride formed in situ so as not to pass water in either direction.

The following will serve as examples of coatings which I have found satisfactory, but it is to be understood that the proportions given may be varied within the purview of my invention:

Example A

| | Parts by weight |
|---|---|
| Stannous chloride (SnCl₂) | 4 |
| Portland cement | 65 |

Example B

| | |
|---|---|
| Stannous chloride (SnCl₂) | 4 |
| Lime | 35 |
| Precipitated silicate | 30 |

Example C

| | |
|---|---|
| Stannous chloride (SnCl₂) | 4 |
| Cement | 65 |
| Lime | 31 |

What I claim is:

1. A cementitious coating material produced by hydrating a mixture comprising cement of the Portland type and stannous chloride, the ratio of stannous chloride to cement being in the order of four parts by weight of stannous chloride to sixty-five parts by weight of cement, and exposing the mixture to the atmosphere, whereby the stannous chloride is converted to water-insoluble stannous oxychloride, which substantially fills the pores and voids of the cement.

2. The method of producing a cementitious coating material, which method comprises adding stannous chloride to cement of the Portland type, the ratio of stannous chloride to cement being in the order of four parts by weight of stannous chloride to sixty-five parts by weight of cement, hydrating the mixture to dissolve the stannous chloride, and coating a surface with the mixture thus produced to expose the stannous chloride to the atmosphere and effect its conversion to water-insoluble stannous oxychloride, which substantially fills the pores and voids of the cement.

STEVEN B. AVERY.

REFERENCES CITED

The following references are of record in the file of this patent:

UNITED STATES PATENTS

| Number | Name | Date |
|---|---|---|
| 1,968,152 | Kirschner | July 31, 1934 |

FOREIGN PATENTS

| Number | Country | Date |
|---|---|---|
| 301,509 | Great Britain | 1930 |